(12) United States Patent
McGrath

(10) Patent No.: US 6,687,806 B1
(45) Date of Patent: Feb. 3, 2004

(54) APPARATUS AND METHOD FOR GENERATING 64 BIT DISPLACEMENT AND IMMEDIATE VALUES

(75) Inventor: Kevin J. McGrath, Los Gatos, CA (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 663 days.

(21) Appl. No.: 09/595,591

(22) Filed: Jun. 15, 2000

(51) Int. Cl.[7] .................................................. G06F 9/30
(52) U.S. Cl. ........................ 712/200; 712/213; 712/226
(58) Field of Search ................................. 712/200, 226, 712/227, 229, 208, 209, 210, 224, 211, 213, 24

(56) References Cited

U.S. PATENT DOCUMENTS

| | | | | |
|---|---|---|---|---|
| 4,206,503 A | * | 6/1980 | Woods et al. | 711/212 |
| 5,136,699 A | * | 8/1992 | Yokoyama | 711/220 |
| 5,696,925 A | * | 12/1997 | Koh | 711/203 |
| 5,828,865 A | * | 10/1998 | Bell | 703/27 |
| 5,859,989 A | * | 1/1999 | Olarig et al. | 710/306 |
| 5,922,065 A | * | 7/1999 | Hull et al. | 712/24 |
| 6,230,253 B1 | * | 5/2001 | Roussel et al. | 712/22 |
| 6,240,510 B1 | * | 5/2001 | Yeh et al. | 712/236 |
| 6,275,927 B2 | * | 8/2001 | Roberts | 712/213 |
| 6,311,248 B1 | * | 10/2001 | Meiyappan et al. | 710/307 |

OTHER PUBLICATIONS

*Intel Architecture Software Developer's manual, vol. I: Basic Architecture*, Intel® Corporation, 1997, Chapter 5, pp. 5–9.

*Intel Architecture Software Developer's Manual, vol. 2: Instruction Set Reference*, Intel® Corporation, 1997, Chapter 2, pp. 1–6.

* cited by examiner

Primary Examiner—Henry W. H. Tsai
(74) Attorney, Agent, or Firm—Lawrence J. Merkel; Meyertons, Hood, Kivlin, Kowert & Goetzel, P.C.

(57) ABSTRACT

An apparatus and method for generating 64 bit displacement and immediate values. In a given processor architecture such as the x86 architecture, instructions may conform to a specified instruction format. The instruction format can include a displacement field and an immediate field. The displacement field can include a displacement value of up to 32 bits and the immediate field can include an immediate value of up to 32 bits. In order to generate 64 bit displacement and immediate values, the 32 bit value from the displacement field of an instruction and the 32 bit value from the immediate field of the instruction may be concatenated to generate a 64 bit concatenated value. The concatenated value may be used by an execution core as a 64 bit displacement or immediate value as specified by the instruction. By concatenating values from the displacement field and immediate field of an instruction, 64 bit displacement and immediate values may be generated without altering an existing instruction format and without the need for additional instructions. In addition, existing decode logic may advantageously be adapted to allow 64 bit displacement and immediate values to be generated.

25 Claims, 8 Drawing Sheets

| LME | CS L Bit | CS D Bit | Operating Mode |
|---|---|---|---|
| 0 | x | 0 | 16 Bit Mode |
| 0 | x | 1 | 32 Bit Mode |
| 1 | 0 | 0 | 16 Bit Compatibility Mode |
| 1 | 0 | 1 | 32 Bit Compatibility Mode |
| 1 | 1 | 0 | 32/64 Mode |
| 1 | 1 | 1 | Reserved |

APPARATUS AND METHOD FOR GENERATING 64 BIT DISPLACEMENT AND IMMEDIATE VALUES

BACKGROUND OF THE INVENTION

1. Field of the Invention

This invention is related to the field of processors and, more particularly, to decoding instruction information in processors.

2. Description of the Related Art

The x86 architecture (also known as the IA-32 architecture) has enjoyed widespread acceptance and success in the marketplace. Accordingly, it is advantageous to design processors according to the x86 architecture. Such processors may benefit from the large body of software written to the x86 architecture (since such processors may execute the software and thus computer systems employing the processors may enjoy increased acceptance in the market due to the large amount of available software).

As computer systems have continued to evolve, 64 bit address size (and sometimes operand size) has become desirable. A larger address size allows for programs having a larger memory footprint (the amount of memory occupied by the instructions in the program and the data operated upon by the program) to operate within the memory space. A larger operand size allows for operating upon larger operands, or for more precision in operands. More powerful applications and/or operating systems may be possible using 64 bit address and/or operand sizes.

Unfortunately, the x86 architecture is limited to a maximum 32 bit operand size and 32 bit address size. The operand size refers to the number of bits operated upon by the processor (e.g. the number of bits in a source or destination operand). The address size refers to the number of bits in an address generated by the processor. Thus, processors employing the x86 architecture may not serve the needs of applications that may benefit from 64 bit address or operand sizes.

x86 instructions have the ability to specify a displacement value and an immediate value. In current implementations of the x86 architecture, displacement and immediate values can be up to 32 bits. Generally speaking, displacement values are used to generate addresses and immediate values are used to generate a numerical result. In architectures where the address and operand sizes increase beyond 32 bits, larger bit sizes of displacement and immediate values may become desirable. It would be desirable for instructions to be able to specify displacement and immediate values larger than 32 bits while using an existing instruction format.

SUMMARY OF THE INVENTION

The problems outlined above are in large part solved by an apparatus and method for generating 64 bit displacement and immediate values. In a given processor architecture such as the x86 architecture, instructions may conform to a specified instruction format. The instruction format can include a displacement field and an immediate field. The displacement field can include a displacement value of up to 32 bits and the immediate field can include an immediate value of up to 32 bits. In order to generate 64 bit displacement and immediate values, the 32 bit value from the displacement field of an instruction and the 32 bit value from the immediate field of the instruction may be concatenated to generate a 64 bit concatenated value. The concatenated value may be used by an execution core as a 64 bit displacement or immediate value as specified by the instruction. By concatenating values from the displacement field and immediate field of an instruction, 64 bit displacement and immediate values may be generated without altering an existing instruction format and without the need for additional instructions. In addition, existing decode logic may advantageously be adapted to allow 64 bit displacement and immediate values to be generated.

In one embodiment, a processor may operate in a 32/64 mode where the default operand size is 32 bits and the default address size is 64 bits. In this embodiment, an instruction may specify a 64 bit displacement value by including 32 bits of the displacement value in the displacement field of the instruction and the remaining 32 bits of the displacement value in the immediate field of the instruction. The two 32 bit values may be concatenated to form the 64 bit displacement value and may be conveyed to an address generation unit. In 32/64 mode, an instruction may specify a 64 bit immediate by using an instruction prefix to override the default operand size of 32 bits. The operating mode may transition the operand size to 64 bits in response to the prefix. The instruction may specify a 64 bit immediate value by including 32 bits of the immediate value in the displacement field of the instruction and the remaining 32 bits of the immediate value in the immediate field of the instruction. The two 32 bit values may be concatenated to form the 64 bit immediate value and may be conveyed to a functional unit.

BRIEF DESCRIPTION OF THE DRAWINGS

Other objects and advantages of the invention will become apparent upon reading the following detailed description and upon reference to the accompanying drawings in which.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Figure 1:
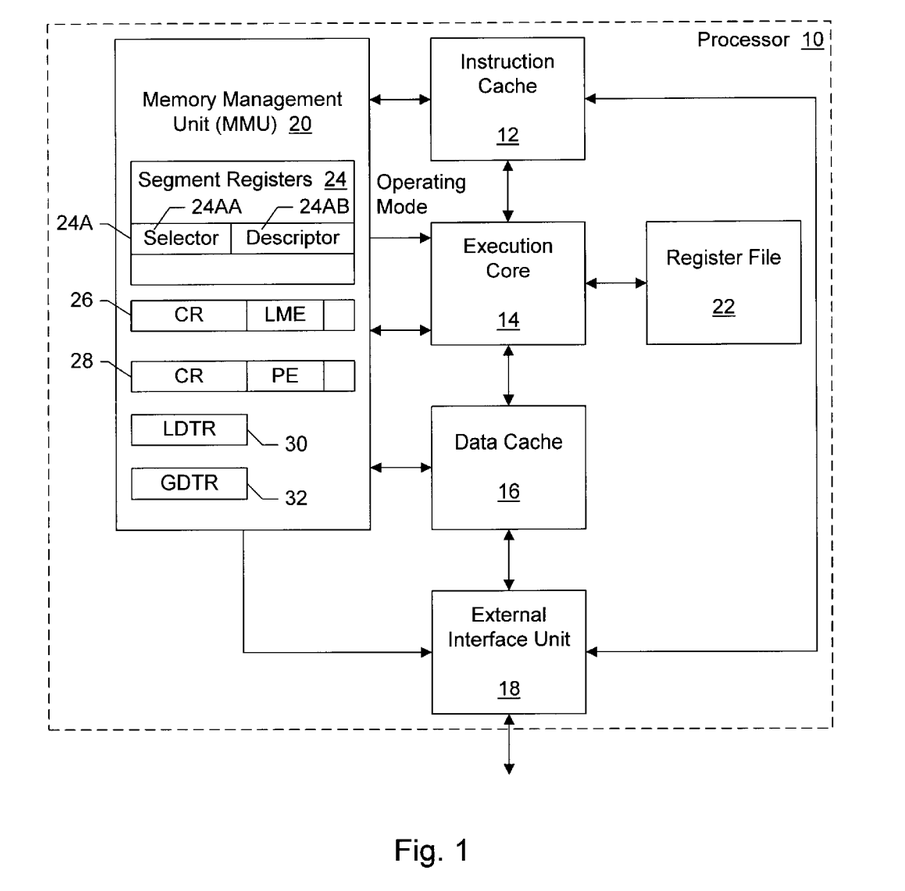
FIG. 1 is a block diagram of one embodiment of a processor.

Turning now to FIG. 1, a block diagram illustrating one embodiment of a processor 10 is shown. Other embodiments are possible and contemplated. In the embodiment of FIG. 1, processor 10 includes an instruction cache 12, an execution core 14, a data cache 16, an external interface unit 18, a memory management unit (MMU) 20, and a register file 22. In the illustrated embodiment, MMU 20 includes a set of segment registers 24, a first control register 26, a second control register 28, a local descriptor table register (LDTR) 30, and a global descriptor table register (GDTR) 32. Instruction cache 12 is coupled to external interface unit 18, execution core 14, and MMU 20. Execution core 14 is further coupled to MMU 20, register file 22, and data cache 16. Data cache 16 is further coupled to MMU 20 and external interface unit 18. External interface unit 18 is further coupled to MMU 20 and to an external interface.

Generally speaking, processor 10 employs a processor architecture compatible with the x86 architecture and including additional architectural features to support 64 bit processing. Processor 10 is configured to establish an operating mode in response to information stored in a code segment descriptor corresponding to the currently executing code and further in response to one or more enable indications stored in one or more control registers. As used herein, an "operating mode" specifies default values for various programmably selectable processor attributes. For example, the operating mode may specify a default operand size and a default address size. The default operand size specifies the number of bits in an operand of an instruction, unless an instruction's encoding overrides the default. The default address size specifies the number of bits in an address of a memory operand of an instruction, unless an instruction's encoding overrides the default. The default address size specifies the size of at least the virtual address of memory operands, and may also specify the size of the physical address. Alternatively, the size of the physical address may be independent of the default address size and may instead be dependent on the LME bit described below (e.g. the physical address may be 32 bits if the LME bit is clear and an implementation-dependent size greater than 32 bits and less than 64 bits if the LME bit is set) or on another control bit (e.g. the physical address extension bit, or PAE bit, in another control register). As used herein, a "virtual address" is an address generated prior to translation through an address translation mechanism (e.g. a paging mechanism) to a "physical address", which is the address actually used to access a memory. Additionally, as used herein, a "segment descriptor" is a data structure created by software and used by the processor to define access control and status for a segment of memory. A "segment descriptor table" is a table in memory having multiple entries, each entry capable of storing a segment descriptor.

In the illustrated embodiment, MMU 20 generates an operating mode and conveys the operating mode to execution core 14. Execution core 14 executes instructions using the operating mode. More particularly, execution core 14 fetches operands having the default operand size from register file 22 or memory (through data cache 16, if the memory operands are cacheable and hit therein, or through external interface unit 18 if the memory operands are noncacheable or miss data cache 16) unless a particular instruction's encoding overrides the default operand size, in which case the overriding operand size is used. Similarly, execution core 14 generates addresses of memory operands, wherein the addresses have the default address size unless a particular instruction's encoding overrides the default address size, in which case the overriding address size is used. In other embodiments, the information used to generate the operating mode may be shadowed locally in the portions of processor 10 which use the operating mode (e.g. execution core 14), and the operating mode may be determined from the local shadow copies.

As mentioned above, MMU 20 generates the operating mode responsive to a code segment descriptor corresponding to the code being executed and further responsive to one or more values in control registers. Information from the code segment descriptor is stored in one of the segment registers 24 (a register referred to as CS, or code segment). Additionally, control register 26 stores an enable indication (LME) which is used to enable an operating mode in which the default address size is greater than 32 bits ("32/64 mode") as well as certain compatibility modes for the 32 bit and 16 bit operating modes. The default operand size may be 32 bits in 32/64 mode, but instructions may override the default 32 bit operand size with a 64 bit operand size when desired. If the LME indication is in an enabled state, then 32/64 mode may be used in addition to 32 bit and 16 bit modes. If the LME indication is in a disabled state, then 32/64 mode is disabled. In one embodiment, the default address size in 32/64 mode may be implementation-dependent but may be any value up to and including 64 bits. Furthermore, the size of the virtual address may differ in a given implementation from the size of the physical address in that implementation.

It is noted that enable indications may be described herein as bits with the enabled state being the set state of the bit and the disabled state being the cleared state of the bit. However, other encodings are possible, including encodings in which multiple bits are used and encodings in which the enabled state is the clear state and the disabled state is the set state. Accordingly, the remainder of this description may refer to the LME indication in control register 26 as the LME bit, with the enabled state being set and the disabled state being clear. However, other encodings of the LME indication are contemplated, as set forth above.

Segment registers 24 store information from the segment descriptors currently being used by the code being executed by processor 10. As mentioned above, CS is one of segment registers 24 and specifies the code segment of memory. The code segment stores the code being executed. Other segment registers may define various data segments (e.g. a stack data segment defined by the SS segment register, and up to four data segments defined by the DS, ES, FS, and GS segment registers). FIG. 1 illustrates the contents of an exemplary segment register 24A, including a selector field 24AA and a descriptor field 24AB. Selector field 24AA is loaded with a segment selector to activate a particular segment in response to certain segment load instructions executed by execution core 14. The segment selector identifies the segment descriptor in a segment descriptor table in memory. More particularly, processor 10 may employ two segment descriptor tables: a local descriptor table and a global descriptor table. The base address of the local descriptor table is stored in the LDTR 30. Similarly, the base address of the global descriptor table is stored in GDTR 32. A bit within the segment selector (the table indicator bit) selects the descriptor table, and the remainder of the segment selector is used as an index into the selected table. When an instruction loads a segment selector into one of segment registers 24, MMU 20 reads the corresponding segment descriptor from the selected segment descriptor table and stores information from the segment descriptor into the segment descriptor field (e.g. segment descriptor field 24AB for segment register 24A). The information stored in the segment descriptor field may comprise any suitable subset of the segment descriptor, including all of the segment descriptor, if desired. Additionally, other information derived from the segment descriptor or other sources may be stored in the segment descriptor field, if desired. For example, an embodiment may decode the operating mode indications from the code segment descriptor and store the decoded value rather than the original values of the operating mode indications. If an instruction causes CS to be loaded with a segment selector, the code segment may change and thus the operating mode of processor 10 may change.

In one embodiment, the CS segment register is used in 32/64 mode. The data segment registers are ignored. In 16 and 32 bit modes, the code segment and data segments may be active. Furthermore, a second enable indication (PE) in control register 28 may affect the operation of MMU 20. The PE enable indication may be used to enable protected mode, in which segmentation and/or paging address translation mechanisms may be used. If the PE enable indication is in the disabled state, segmentation and paging mechanisms are disabled and processor 10 is in "real mode" (in which addresses generated by execution core 14 are physical addresses). Similar to the LME indication, the PE indication may be a bit in which the enabled state is the bit being set and the disabled state is the bit being clear. However, other embodiments are contemplated as described above.

It is noted that MMU 20 may employ additional hardware mechanisms, as desired. For example, MMU 20 may include paging hardware to implement paging address translation from virtual addresses to physical addresses. The paging hardware may include a translation lookaside buffer (TLB) to store page translations.

It is noted that control registers 26 and 28 may be implemented as architected control registers (e.g. control register 26 may be CR4 and control register 28 may be CR0). Alternatively, one or both of the control registers may be implemented as model specific registers to allow for other uses of the architected control registers without interfering with 32/64 mode.

Generally, instruction cache 12 is a high speed cache memory for storing instruction bytes. Execution core 14 fetches instructions from instruction cache 12 for execution. Instruction cache 12 may employ any suitable cache organization, including direct-mapped, set associative, and fully associative configurations. If an instruction fetch misses in instruction cache 12, instruction cache 12 may communicate with external interface unit 18 to fill the missing cache line into instruction cache 12. Additionally, instruction cache 12 may communicate with MMU 20 to receive physical address translations for virtual addresses fetched from instruction cache 12.

Execution core 14 executes the instructions fetched from instruction cache 12. Execution core 14 fetches register operands from register file 22 and updates destination registers in register file 22. The size of the register operands is controlled by the operating mode and any overrides of the operating mode for a particular instruction. Similarly, execution core 14 fetches memory operands from data cache 16 and updates destination memory locations in data cache 16, subject to the cacheability of the memory operands and hitting in data cache 16. The size of the memory operands is similarly controlled by the operating mode and any overrides of the operating mode for a particular instruction. Furthermore, the size of the addresses of the memory operands generated by execution core 14 is controlled by the operating mode and any overrides of the operating mode for a particular instruction.

Execution core 14 may employ any suitable construction. For example, execution core 14 may be a superpipelined core, a superscalar core, or a combination thereof. Execution core 14 may employ out of order speculative execution or in order execution, according to design choice.

Figure 7A:
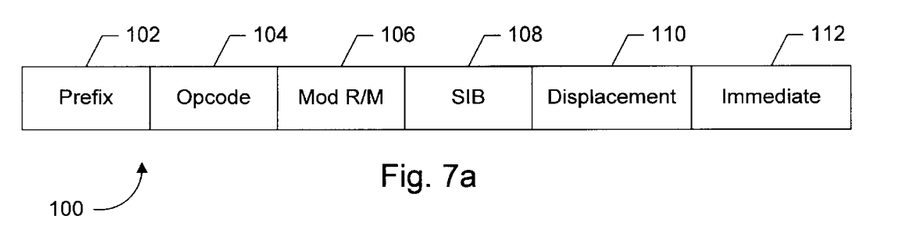
FIG. 7*a* is a block diagram of one embodiment of an instruction format.

Register file 22 may include 64 bit registers which may be accessed as 64 bit, 32 bit, 16 bit, or 8 bit registers as indicated by the operating mode of processor 10 and any overrides for a particular instruction. The register format for one embodiment is described below with respect to FIG. 7. The registers included in register file 22 may include the LEAX, LEBX, LECX, LEDX, LEDI, LESI, LESP, and LEBP registers. Register file 22 may further include the LEIP register. Alternatively, execution core 14 may employ a form of register renaming in which any register within register file 22 may be mapped to an architected register. The number of registers in register file 22 may be implementation dependent for such an embodiment.

Data cache 16 is a high speed cache memory configured to store data. Data cache 16 may employ any suitable cache organization, including direct-mapped, set associative, and fully associative configurations. If a data fetch or update misses in data cache 16, data cache 16 may communicate with external interface unit 18 to fill the missing cache line into data cache 16. Additionally, if data cache 16 employs a writeback caching policy, updated cache lines which are being cast out of data cache 16 may be communicated to external interface unit 18 to be written back to memory. Data cache 16 may communicate with MMU 20 to receive physical address translations for virtual addresses presented to data cache 16.

External interface unit 18 communicates with portions of the system external to processor 10. External interface unit 18 may communicate cache lines for instruction cache 12 and data cache 16 as described above, and may communicate with MMU 20 as well. For example, external interface unit 18 may access the segment descriptor tables and/or paging tables on behalf of MMU 20.

It is noted that processor 10 may include an integrated level 2 (L2) cache, if desired. Furthermore, external interface unit 18 may be configured to communicate with a backside cache in addition to communicating with the system.

Figure 2:
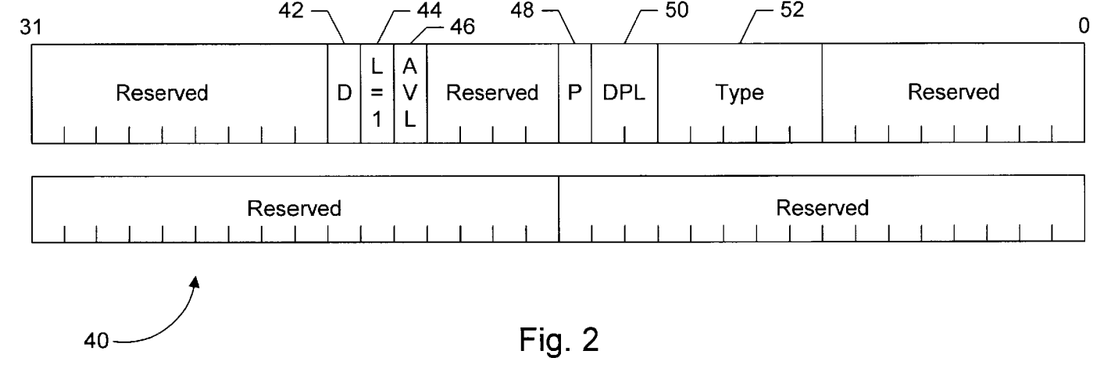
FIG. 2 is a block diagram of one embodiment of a segment descriptor for 32/64 mode.

Turning now to FIG. 2, a block diagram of one embodiment of a code segment descriptor 40 for 32/64 mode is shown. Other embodiments are possible and contemplated. In the embodiment of FIG. 2, code segment descriptor 40 comprises 8 bytes with the most significant 4 bytes illustrated above the least significant 4 bytes. The most significant four bytes are stored at a numerically larger address than the least significant four bytes. The most significant bit of each group of four bytes is illustrated as bit 31 in FIG. 2 (and FIG. 3 below), and the least significant bit is illustrated as bit 0. Short vertical lines within the four bytes delimit each bit, and the long vertical lines delimit a bit but also delimit a field (both in FIG. 2 and in FIG. 3).

Unlike the 32 bit and 16 bit code segment descriptors illustrated in FIG. 3 below, code segment descriptor 40 does not include a base address or limit. Processor 10 employs a flat virtual address space for 32/64 mode (rather than the segmented linear address space employed in 32 bit and 16 bit modes). Accordingly, the portions of code segment descriptor 40 which would otherwise store the base address and limit are reserved in segment descriptor 40. It is noted that a virtual address provided through segmentation may also be referred to herein as a "linear address". The term "virtual address" encompasses any address which is translated through a translation mechanism to a physical address actually used to address memory, including linear addresses and other virtual addresses generated in non-segmented architectures.

Figure 5:
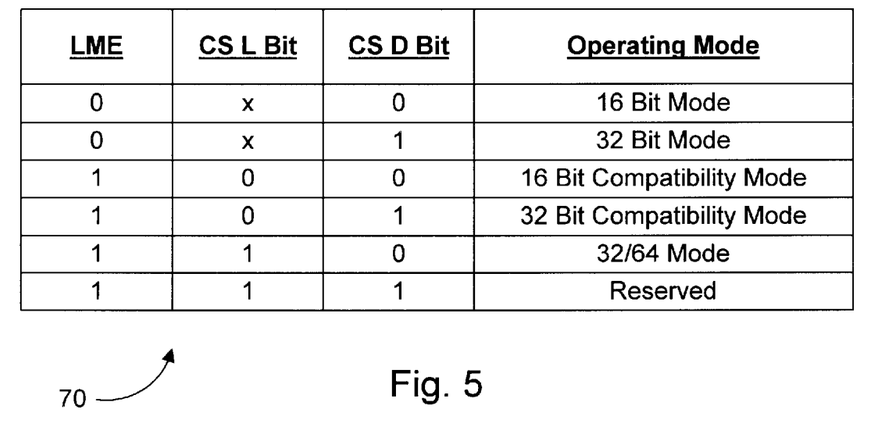
FIG. 5 is a table illustrating one embodiment of operating modes as a function of segment descriptor and control register values.

Segment descriptor 40 includes a D bit 42, an L bit 44 (set to one for a 32/64 mode code segment), an available bit (AVL) 46, a present (P) bit 48, a descriptor privilege level (DPL) 50, and a type field 52. D bit 42 and L bit 44 are used to determine the operating mode of processor 10, as illustrated in FIG. 5 below. AVL bit 46 is available for use by system software (e.g. the operating system). P bit 48 is used to indicate whether or not the segment is present in memory. If P bit 48 is set, the segment is present and code may be fetched from the segment. If P bit 48 is clear, the segment is not present and an exception is generated to load the segment into memory (e.g. from disk storage or through a network connection). The DPL indicates the privilege level of the segment. Processor 10 employs four privilege levels (encoded as 0 through 3 in the DPL field, with level 0 being the most privileged level). Certain instructions and processor resources (e.g. configuration and control registers) are only executable or accessible at the more privileged levels, and attempts to execute these instructions or access these resources at the lower privilege levels result in an exception. When information from code segment 40 is loaded into the CS segment register, the DPL becomes the current privilege level (CPL) of processor 10. Type field 52 encodes the type of segment. For code segments, the most significant bit two bits of type field 52 may be set (the most significant bit distinguishing a code or data segment from a system segment, and the second most significant bit distinguishing a code segment from a data segment), and the remaining bits may encode additional segment type information (e.g. execute only, execute and read, or execute and read only, conforming, and whether or not the code segment has been accessed).

It is noted that, while several indications in the code segment descriptor are described as bits, with set and clear values having defined meanings, other embodiments may employ the opposite encodings and may use multiple bits, as desired. Thus, for example, the D bit 42 and the L bit 44 may each be an example of an operating mode indication which may be one or more bits as desired, similar to the discussion of enable indications above.

Figure 3:
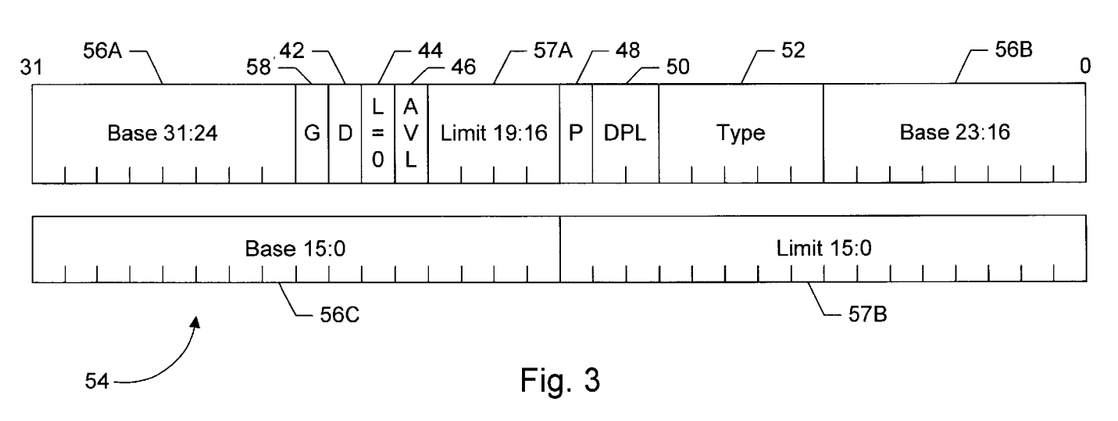
FIG. 3 is a block diagram of one embodiment of a segment descriptor for compatibility mode.

Turning now to FIG. 3, a block diagram of one embodiment of a code segment descriptor 54 for 32 and 16 bit compatibility mode is shown. Other embodiments are possible and contemplated. As with the embodiment of FIG. 2, code segment descriptor 54 comprises 8 bytes with the most significant 4 bytes illustrated above the least significant 4 bytes.

Code segment descriptor 54 includes D bit 42, L bit 44, AVL bit 46, P bit 48, DPL 50, and type field 52 similar to the above description of code segment descriptor 40. Additionally, code segment descriptor 54 includes a base address field (reference numerals 56A, 56B, and 56C), a limit field (reference numerals 57A and 57B) and a G bit 58. The base address field stores a base address which is added to the logical fetch address (stored in the LEIP register) to form the linear address of an instruction, which may then optionally be translated to a physical address through a paging translation mechanism. The limit field stores a segment limit which defines the size of the segment. Attempts to access a byte at a logical address greater than the segment limit are disallowed and cause an exception. G bit 58 determines the scaling of the segment limit field. If G bit 58 is set the limit is scaled to 4K byte pages (e.g. 12 least significant zeros are appended to the limit in the limit field). If G bit 58 is clear, the limit is used as is.

It is noted that code segment descriptors for 32 and 16 bit modes when 32/64 mode is not enabled via the LME bit in control register 26 may be similar to code segment descriptor 54, except the L bit is reserved and defined to be zero. It is further noted that, in 32 and 16 bit modes (both compatibility mode with the LME bit set and modes with the LME bit clear) according to one embodiment, data segments are used as well. Data segment descriptors may be similar to code segment descriptor 54, except that the D bit 42 is defined to indicate the upper bound of the segment or to define the default stack size (for stack segments).

Figure 4:
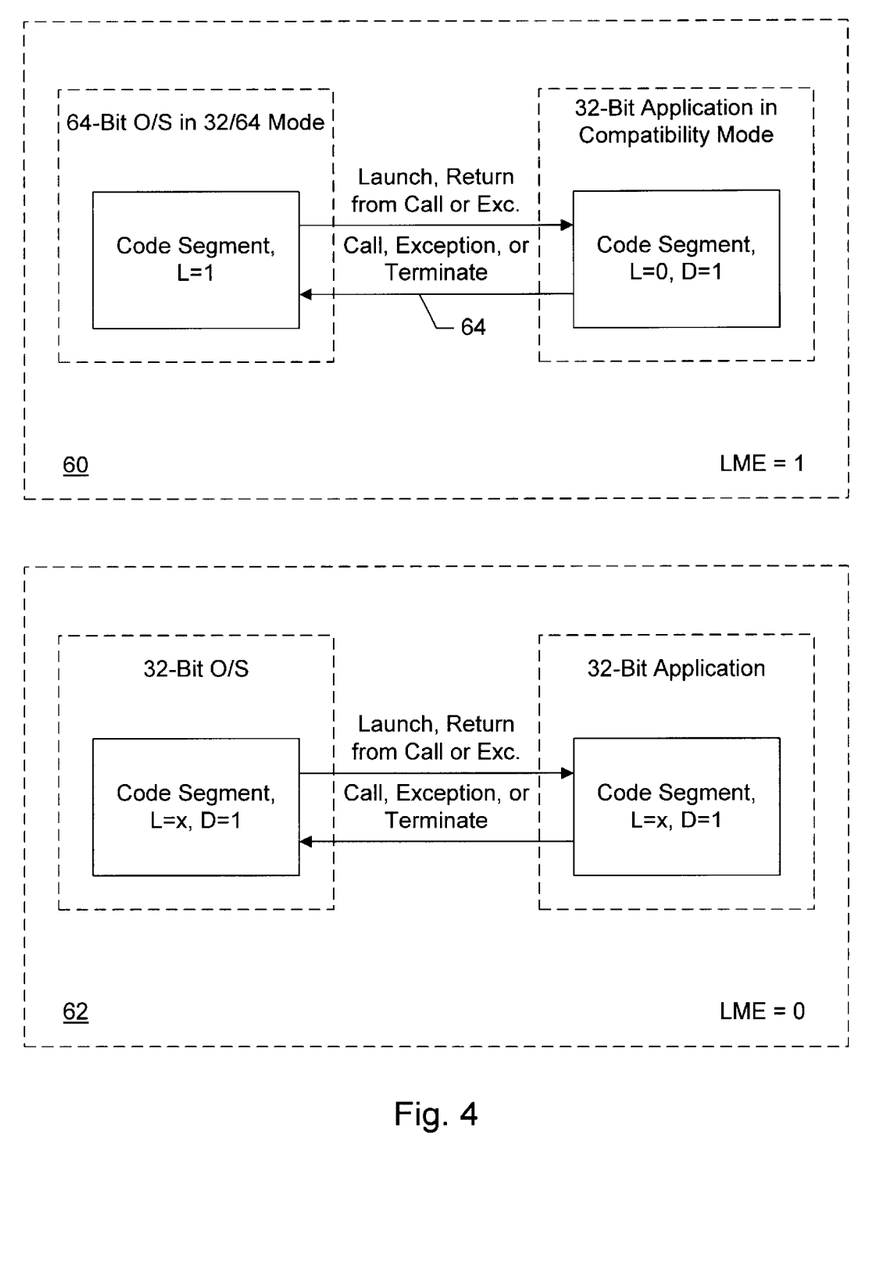
FIG. 4 is a block diagram of operation in compatibility mode and in legacy mode according to one embodiment of the processor shown in FIG. 1.

Turning next to FIG. 4, a diagram illustrating exemplary uses of the LME bit in control register 26 and the compatibility modes to allow for a high degree of flexibility in implementing the 32/64 mode and the 32 and 16 bit modes is shown. A box 60 illustrates exemplary operation when the LME bit is set, and a box 62 illustrates exemplary operation when the LME bit is clear.

As illustrated in box 60, the compatibility modes supported when the LME bit is set may allow for a 64 bit operating system (i.e. an operating system designed to take advantage of the virtual and physical address spaces in excess of 32 bits and/or data operands of 64 bits) to operate with a 32 bit application program (i.e. an application program written using 32 bit operand and address sizes). The code segment for the operating system may be defined by the 32/64 mode code segment descriptor 40 illustrated in FIG. 2, and thus the L bit may be set. Accordingly, the operating system may take advantage of the expanded virtual address space and physical address space for the operating system code and the data structures maintained by the operating system (including, e.g. the segment descriptor tables and the paging translation tables). The operating system may also use the 64 bit data type defined in 32/64 mode using instruction encodings which override the default 32 bit operand size. Furthermore, the operating system may launch a 32 bit application program by establishing one or more 32 bit compatibility mode segment descriptors (L bit cleared, D bit set, e.g. segment descriptor 54 shown in FIG. 2) in the segment descriptor table and branching into one of the compatibility mode segments. Similarly, the operating system may launch a 16 bit application program by establishing one or more 16 bit compatibility mode segment descriptors (L bit cleared, D bit cleared, e.g. segment descriptor 54 shown in FIG. 2) in the segment descriptor table and branching into one of the compatibility mode segments. Accordingly, a 64 bit operating system may retain the ability to execute existing 32 bit and 16 bit application programs in the compatibility mode. A particular application program may be ported to 32/64 mode if the expanded capabilities are desired for that program, or may remain 32 bit or 16 bit.

While processor 10 is executing the 32 bit application program, the operating mode of processor 10 is 32 bit. Thus, the application program may generally execute in the same fashion as it does in 32 bit mode with the LME bit clear (e.g. when the operating system is a 32 bit operating system as well). However, the application program may call an operating system service, experience an exception, or terminate. In each of these cases, processor 10 may return to executing operating system code (as illustrated by arrow 64 in FIG. 4). Since the operating system code operates in 32/64 mode, the address of the operating system service routine, exception handler, etc. may exceed 32 bits. Thus, processor 10 may need to generate an address greater than 32 bits prior to returning to the operating system code. The LME bit provides processor 10 with an indication that the operating system may be operating in 32/64 mode even though the current operating mode is 32 bit, and thus processor 10 may provide the larger address space for operating system calls and exceptions.

In one embodiment, exceptions are handled using interrupt segment descriptors stored in an interrupt segment descriptor table. If the LME bit is set, the interrupt segment descriptors may be 16 byte entries which include a 64 bit address of the operating system routine which handles the exception. If the LME bit is clear, the interrupt segment descriptors may be eight byte entries which include a 32 bit address. Accordingly, processor 10 accesses the interrupt descriptor table responsive to the LME indication (i.e. reading a 16 byte entry if the LME bit is set and reading an eight byte entry if the LME bit is clear). Therefore, exceptions may be handled by the 64 bit operating system even though the application program is executing in 32 bit compatibility mode. Furthermore, processor 10 supports a 32 bit (or 16 bit) operating system if the LME bit is clear.

Similarly, the call mechanisms within processor 10 may operate in different fashions based on the state of the LME bit. Since the operating system typically executes at a higher privilege level than the application program, transfers from the application program to the operating system are carefully controlled to ensure that the application program is only able to execute permitted operating system routines. More generally, changes in privilege level are carefully controlled. In one embodiment, processor 10 may support at least two mechanisms for performing operating system calls. One method may be through a call gate in the segment descriptor tables (described in more detail below). Another method may be the SYSCALL instruction supported by processor 10, which uses a model specific register as the source of the address of the operating system routine. Updating the model specific registers is a privileged operation, and thus only code executing at a higher privilege level (e.g. operating system code) may establish the address in the model specific register used by the SYSCALL instruction. For the SYSCALL method, a second model specific register may be defined to store the most significant 32 bits of the address of the operating system routine. Thus, if the LME bit is set, the address may be read from the two model specific registers. If the LME bit is clear, the address may be read from the model specific register storing the least significant 32 bits. Alternatively, the model specific register used by the SYSCALL instruction may be expanded to 64 bits and the address may be 32 bits (the least significant 32 bits of the model specific register) or 64 bits based on the state of the LME bit.

As illustrated above, having the LME bit set may allow for processor 10 to operate in a system in which the operating system is 64 bit and one or more application programs are not 64 bit (e.g. 32 bit as shown or 16 bit, which operates in a similar fashion to the above description). Additionally, as illustrated by box 62, having the LME bit clear may allow for processor 10 to operate in 32 bit or 16 bit modes compatible with the x86 architecture. As described above, the mechanisms for handling exceptions and operating system calls are designed to handle the LME bit being set or clear, and thus the 32 bit and 16 bit modes may operate unmodified, even though processor 10 is capable of operating in 32/64 mode. Furthermore, by providing the x86 compatible 16 and 32 bit modes when the LME bit is clear, (and ignoring the L bit, which is reserved in these modes) processor 10 may operate in a system in which the L bit is defined for some other purpose than for 32/64 mode and may still support 32/64 mode if the LME bit is set. Accordingly, a system employing a 32 bit operating system and 32 bit or 16 bit application programs may employ processor 10. Subsequently, the system could be upgraded to a 64 bit operating system without having to change processor 10.

Not illustrated in FIG. 4 is a 64 bit operating system and a 64 bit application program operating with the LME bit set. The mechanisms for calling operating system routines described above for the 64 bit operating system and 32 bit application program may apply equally to the 64 bit application program as well. Additionally, call gates which support 64 bits of offset are supported (as will be described in more detail below).

Turning next to FIG. 5, a table 70 is shown illustrating the states of the LME bit, the L bit in the code segment descriptor, and the D bit in the code segment descriptor and the corresponding operating mode of processor 10 according to one embodiment of processor 10. Other embodiments are possible and contemplated. As table 70 illustrates, if the LME bit is clear, then the L bit is reserved (and defined to be zero). However, processor 10 may treat the L bit as a don't care if the LME bit is clear. Thus, the x86 compatible 16 bit and 32 bit modes may be provided by processor 10 if the LME bit is clear. If the LME bit is set and the L bit in the code segment is clear, then a compatibility operating mode is established by processor 10 and the D bit selects 16 bit or 32 bit mode. If the LME bit and the L bit are set and the D bit is clear, 32/64 mode is selected for processor 10. Finally, the mode which would be selected if the LME, L and D bits are all set is reserved.

As mentioned above, the 32/64 operating mode includes a default address size in excess of 32 bits (implementation dependent but up to 64 bits) and a default operand size of 32 bits. The default operand size of 32 bits may be overridden to 64 bits via a particular instruction's encoding. The default operand size of 32 bits is selected to minimize average instruction length (since overriding to 64 bits involves including an instruction prefix in the instruction encoding which may increase the instruction length) for programs in which 32 bits are sufficient for many of the data manipulations performed by the program. For such programs (which may be a substantial number of the programs currently in existence), moving to a 64 bit operand size may actually reduce the execution performance achieved by the program (i.e. increased execution time). In part, this reduction may be attributable to the doubling in size in memory of the data structures used by the program when 64 bit values are stored. If 32 bits is sufficient, these data structures would store 32 bit values, Thus, the number of bytes accessed when the data structure is accessed increases if 64 bit values are used where 32 bit values would be sufficient, and the increased memory bandwidth (and increased cache space occupied by each value) may cause increased execution time. Accordingly, 32 bits is selected as the default operand size and the default may be overridden via the encoding of a particular instruction.

Figure 6:
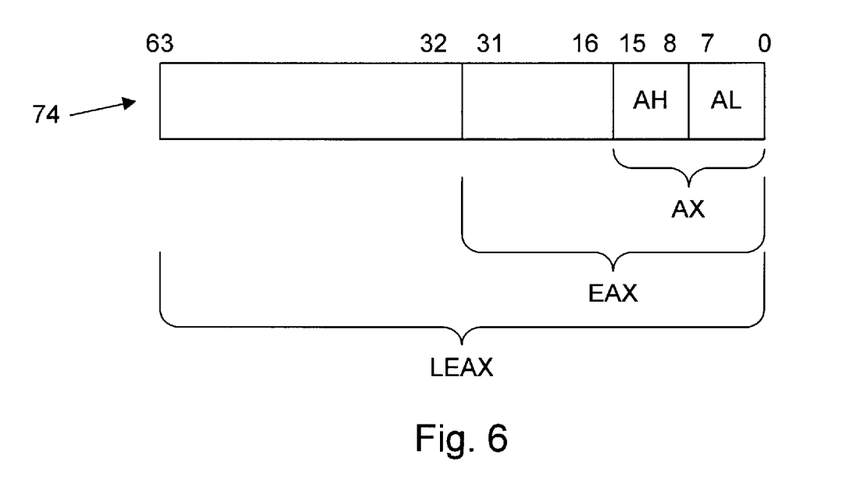
FIG. 6 is a block diagram of one embodiment of a register.

Turning now to FIG. 6, a diagram illustrating one embodiment of the LEAX register 74 is shown. Other registers within register file 22 may be similar. Other embodiments are possible and contemplated. In the embodiment of FIG. 6, register 74 includes 64 bits, with the most significant bit labeled as bit 63 and the least significant bit labeled as bit 0. FIG. 6 illustrates the portions of the LEAX register accessed based upon the operand size of an instruction (if the A register is selected as an operand). More particularly, the entirety of register 74 is accessed if the operand size is 64 bits (as illustrated by the brace labeled "LEAX" in FIG. 6). If the operand size is 32 bits, bits 31:0 of register 74 are accessed (as illustrated by the brace labeled "EAX" in FIG. 6). If the operand size is 16 bits, bits 16:0 of the register are accessed (as illustrated by the brace labeled "AX" in FIG. 6). The above operand sizes may be selected based on the operating mode and the inclusion of any override prefixes. However, certain instruction opcodes are defined which access an eight bit register (AH or AL in FIG. 6).

Turning now to FIG. 7a, a block diagram of one embodiment of an instruction format is shown. Other embodiments are possible and contemplated. FIG. 7a depicts instruction format 100. Instruction format 100 includes prefix field 102, opcode field 104, mod r/m field 106, SIB field 108, displacement field 110, and immediate field 112. Each field in instruction format 100 can be comprised of one or more bytes. Individual instructions may omit certain fields.

In instruction format 100, opcode field 104 can specify the opcode of the instruction, mod r/m field 106 and SIB field 108 can specify the operands and memory addressing modes, displacement field 110 can specify a portion of a memory address, and immediate field 112 can specify an immediate operand value. Prefix field 102 can specify additional information regarding the instruction.

Displacement field 110 and immediate field 112 can each comprise one, two, or four bytes. As a result, these fields can specify values that comprise up to 32 bits. Thus, in instruction format 100, 64 bit displacement and immediate values cannot be directly specified.

Figure 7B:
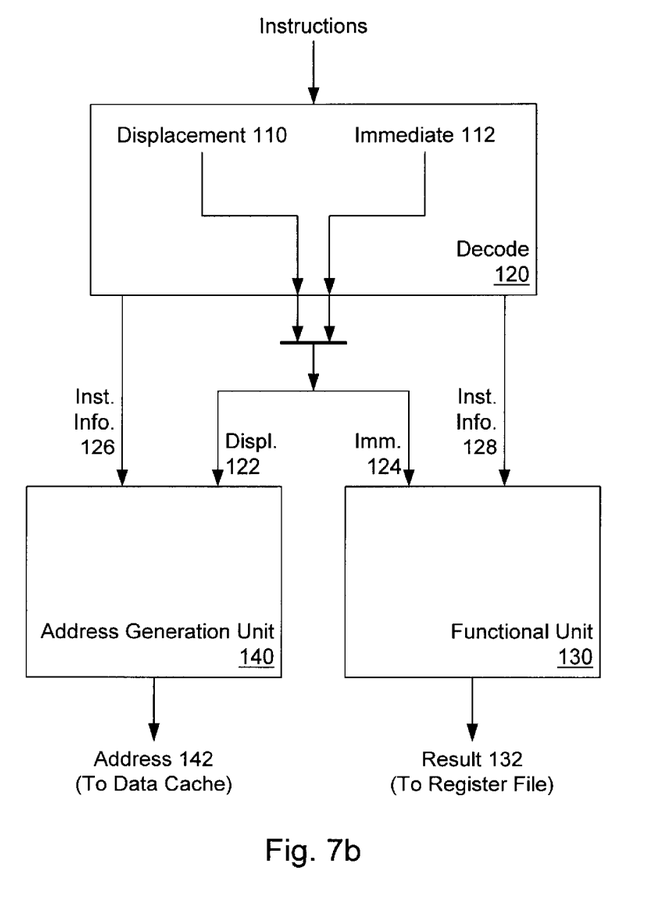
FIG. 7*b* is a block diagram of one embodiment of a portion of a processor.

Turning now to FIG. 7b, a block diagram of one embodiment of a portion of a processor is shown. Other embodiments are possible and contemplated. FIG. 7b depicts decode unit 120 coupled to address generation unit 140 and functional unit 130. In one embodiment, address generation unit 140 and functional unit 130 can comprise portions of an execution core such as execution core 14 shown in FIG. 1.

Decode unit 120 can receive and decode instructions. These instructions may come from an instruction cache such as instruction cache 12 as shown in FIG. 1. The instructions can conform to an instruction format as defined by the architecture of a processor. In one embodiment, the instructions received by decode unit 120 can conform to the instruction format shown in FIG. 7a. Accordingly, these instructions may include a displacement field 110 and an immediate field 120. The displacement field and the immediate fields may include a displacement value and an immediate value, respectively. In order to simplify the logic in decode unit 120 and allow instructions to conform to a well-known instruction format, such as the instruction format used by the x86 architecture, displacement values and immediate values may each be limited to a maximum size of 32 bits.

The use of displacement and immediate values of more than 32 may be desirable where address or operand sizes are greater than 32 bits. In 32/64 mode, for example, the address size is 64 bits and the operand size may be increased to 64 bits using an instruction override.

In the embodiment of FIG. 7b, 64 bit displacement and immediate values may be generated by concatenating a 32 bit value from the displacement field and a 32 bit value from the immediate field of a instruction as specified by the instruction. As shown in FIG. 7b, displacement value 10 and immediate value 112 may be concatenated to form a concatenated value. In one embodiment, displacement value 110 and immediate value 112 each comprise 32 bits such that the concatenated value comprises 64 bits. The concatenated value may be used by an execution core either as a 64 bit displacement value 122 or a 64 bit immediate value 124 as specified by the instruction.

In one embodiment, instructions that specify 64 bit displacement and immediate values may be configured to indicate to decode unit 120 that they include both a displacement field 110 and an immediate field 112. Accordingly, decode unit 120 may be configured to convey a displacement value and an immediate value to an execution core for these instructions. The displacement value and the immediate value may be concatenated to form a 64 bit value. The concatenation may occur in decode unit 120, an execution core, or other unit according to a design choice. Instructions that specify 64 bit displacement and immediate values may correspond to other instructions that normally do not include either a displacement field 110 or an immediate field 112. Accordingly, the instructions that specify 64 bit displacement and immediate values may cause decode unit 120 to provide both a displacement value and an immediate value to an execution core. It may be noted that the displacement value and immediate value may be concatenated prior to being conveyed to an execution core.

When the processor is operating in 32/64 mode, decode unit 120 may be configured to determine whether an instruction specifies a 64 bit displacement or immediate value. If the instruction specifies a 64 bit displacement value, then the values in displacement field 110 and immediate field 112 may be concatenated to form a 64 bit displacement value. It can be noted that in 32/64 mode, address sizes are defined to be 64 bits unless the address size is overridden using an instruction prefix override. Accordingly, the displacement specified by an instruction may be 64 bits without the need for an instruction prefix to override the default address size. If the instruction specifies a 64 bit immediate value, then the values in displacement field 110 and immediate field 112 may be concatenated to form a 64 bit immediate value. In 32/64 mode, operand sizes are defined to be 32 bits unless the operand size is overridden using an instruction prefix override. Accordingly, an instruction may override the default operand size in order to specify a 64 bit immediate. Instructions may use an instruction prefix to override the default operand size, and, in this case, specify a 64 bit immediate. If an instruction does not specify either a 64 bit displacement or a 64 bit immediate, then the values in displacement field 110 and immediate field 112 may not be concatenated but one or both values may be provided to an execution core, if present, as required to execute the instruction.

In the embodiment of FIG. 7b, displacement value 122 can be conveyed to address generation unit 140 along with instruction information 126. Address generation unit 140 can use displacement value 122 and instruction information 126 to generate an address 142 and can provide address 142 to a data cache or other memory structure as indicated. For certain instructions, displacement value 122 may be conveyed directly as address 142.

As an example, the instruction:
  MOV AL, moffset
specifies loading a value at the address represented by "moffset" into register AL. In 32/64 mode, the value of "moffset" may comprise 64 bits and may be included in the instruction format as a 32 bit value in the displacement field 110 of the instruction and a A 32 bit value in the immediate field 112 of the instruction. These two 32 bit values may be concatenated to form the "moffset" value and conveyed to address generation unit 140 as displacement 122. Address generation unit 140 may convey the "moffset" value as address 142 to a data cache or other memory structure to fetch the value stored at the location indicated by the "moffset" value. For other types of instructions, address generation unit 140 may generate address 142 using displacement 122 in other ways.

Immediate value 124 may be conveyed to functional unit 130 along with instruction information 128. Functional unit 130 may use immediate value 124 and instruction information 128 to generate a result 132. Result 132 may be provided to a register file or other memory structure as indicated. For certain instructions, immediate value 124 may be conveyed directly as result 132.

As an example, the instruction:

[prefix] MOV LEAX, Imm64 specifies loading the 64 bit immediate value "Imm64" into register LEAX. It can be noted that the prefix may be used to override the default operand size, if necessary, in order to set the operand size to 64 bits. The 64 bit immediate value may be included in the instruction format as a 32 bit value in the displacement field 110 of the instruction and a 32 bit value in the immediate field 112 of the instruction. These two 32 bit values can be concatenated to form the "Imm64" value and conveyed to functional unit 130 as immediate 124. Functional unit 130 may convey the "Imm64" value as result 132 to a register file or other memory structure to be stored. For other types of instructions, functional unit may generate result 132 using immediate 124 in other ways.

It can be noted that FIG. 7b illustrates a simplified view of decode unit 120. Decode unit 120 may be configured to decode multiple instructions in a clock cycle. In certain embodiments, decode unit 120 may be configured to concatenate displacement and immediate values. In other embodiments, decode unit 120 may be configured to provide both displacement 110 and immediate 112 to an execution core for certain instructions. The execution core may be configured to concatenate displacement and immediate values.

Displacement and immediate values may be generated by concatenating the value from the immediate field of an instruction as the high order bits of the concatenated value and the value from the displacement field as the low order bits of the concatenated value or vice versa.

It can be noted other structures such as a reservation station or scheduler may be included between decode 120 and address generation unit 140 and functional unit 130. In addition, other embodiments may include multiple address generation units and/or functional units as part of an execution core.

Figure 8:
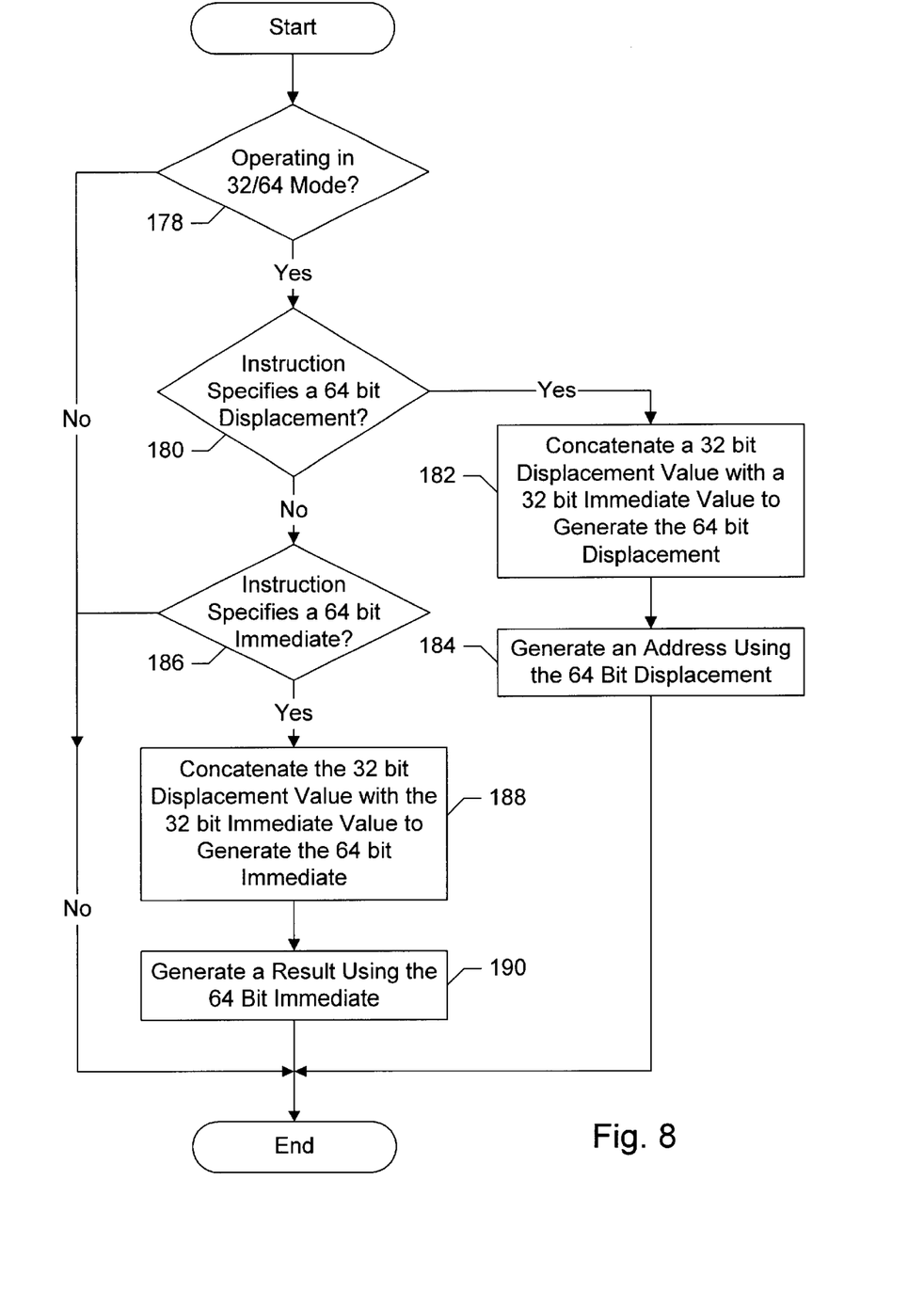
FIG. 8 is a flow chart illustrating a method of generating 64 bit displacements and immediates.

Turning now to FIG. 8, a flow chart illustrating a method of generating 64 bit displacements and immediates is shown. Variations on the method are possible and contemplated. In FIG. 8, a determination is made as to whether a processor is operating in 32/64 mode as indicated in block 178. If the a processor is operating in 32/64 mode, then a determination can be made as to whether an instruction specifies a 64 bit displacement as indicated in block 180. If the instruction specifies a 64 bit displacement, then a 32 bit displacement value can be concatenated with a 32 bit immediate value to generate a 64 bit displacement as indicated in block 182. An address can be generated using the 64 bit displacement as indicated in block 184. It can be noted that the address may be identical to the 64 bit displacement for certain instructions.

If the instruction does not specify a 64 bit displacement, a determination can be made as to whether the instruction specifies a 64 bit immediate as indicated in block 186. In 32/64 mode, the instruction may specify a 64 bit immediate using an instruction prefix to override the default operand size of the operating mode. If the instruction specifies a 64 bit immediate, then a 32 bit displacement value can be concatenated with a 32 bit immediate value to generate a 64 bit immediate as indicated in block 188. A result can be generated using the 64 bit immediate as indicated in block 190. It can be noted that the result may be identical to the 64 bit immediate for certain instructions.

Computer Systems

Figure 9:
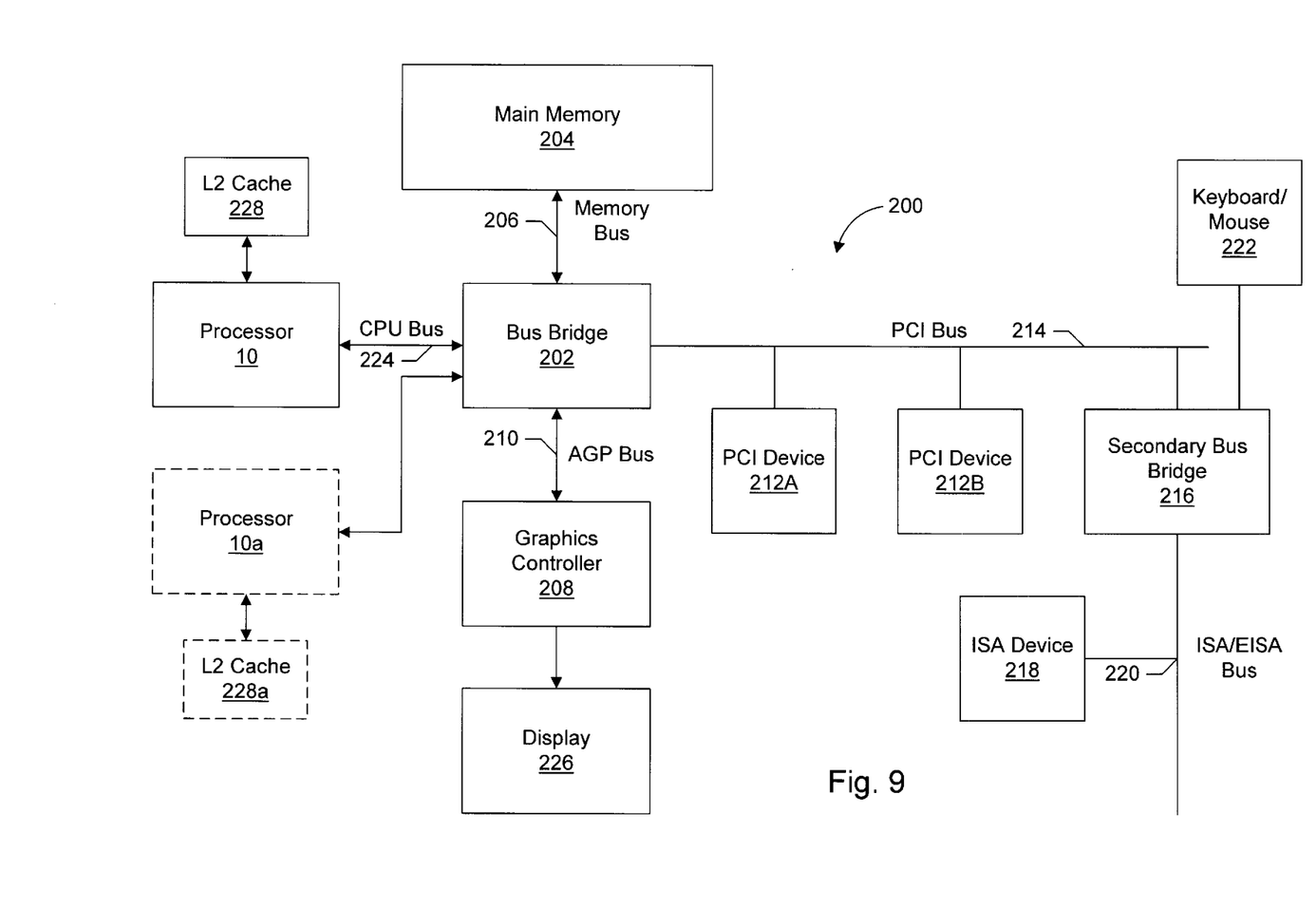
FIG. 9 is a block diagram of one embodiment of a computer system including the processor shown in FIG. 1.

Turning now to FIG. 9, a block diagram of one embodiment of a computer system 200 including processor 10 coupled to a variety of system components through a bus bridge 202 is shown. Other embodiments are possible and contemplated. In the depicted system, a main memory 204 is coupled to bus bridge 202 through a memory bus 206, and a graphics controller 208 is coupled to bus bridge 202 through an AGP bus 210. Finally, a plurality of PCI devices 212A–212B are coupled to bus bridge 202 through a PCI bus 214. A secondary bus bridge 216 may further be provided to accommodate an electrical interface to one or more EISA or ISA devices 218 through an EISA/ISA bus 220. Processor 10 is coupled to bus bridge 202 through a CPU bus 224 and to an optional L2 cache 228. Together, CPU bus 224 and the interface to L2 cache 228 may comprise an external interface to which external interface unit 18 may couple.

Bus bridge 202 provides an interface between processor 10, main memory 204, graphics controller 208, and devices attached to PCI bus 214. When an operation is received from one of the devices connected to bus bridge 202, bus bridge 202 identifies the target of the operation (e.g. a particular device or, in the case of PCI bus 214, that the target is on PCI bus 214). Bus bridge 202 routes the operation to the targeted device. Bus bridge 202 generally translates an operation from the protocol used by the source device or bus to the protocol used by the target device or bus.

In addition to providing an interface to an ISA/EISA bus for PCI bus 214, secondary bus bridge 216 may further incorporate additional functionality, as desired. An input/output controller (not shown), either external from or integrated with secondary bus bridge 216, may also be included within computer system 200 to provide operational support for a keyboard and mouse 222 and for various serial and parallel ports, as desired. An external cache unit (not shown) may further be coupled to CPU bus 224 between processor 10 and bus bridge 202 in other embodiments. Alternatively, the external cache may be coupled to bus bridge 202 and cache control logic for the external cache may be integrated into bus bridge 202. L2 cache 228 is further shown in a backside configuration to processor 10. It is noted that L2 cache 228 may be separate from processor 10, integrated into a cartridge (e.g. slot 1 or slot A) with processor 10, or even integrated onto a semiconductor substrate with processor 10.

Main memory 204 is a memory in which application programs are stored and from which processor 10 primarily executes. A suitable main memory 204 comprises DRAM (Dynamic Random Access Memory). For example, a plurality of banks of SDRAM (Synchronous DRAM) or Rambus DRAM (RDRAM) may be suitable.

PCI devices 212A–212B are illustrative of a variety of peripheral devices such as, for example, network interface cards, video accelerators, audio cards, hard or floppy disk drives or drive controllers, SCSI (Small Computer Systems Interface) adapters and telephony cards. Similarly, ISA device 218 is illustrative of various types of peripheral devices, such as a modem, a sound card, and a variety of data acquisition cards such as GPIB or field bus interface cards.

Graphics controller 208 is provided to control the rendering of text and images on a display 226. Graphics controller 208 may embody a typical graphics accelerator generally known in the art to render three-dimensional data structures which can be effectively shifted into and from main memory 204. Graphics controller 208 may therefore be a master of AGP bus 210 in that it can request and receive access to a target interface within bus bridge 202 to thereby obtain access to main memory 204. A dedicated graphics bus accommodates rapid retrieval of data from main memory 204. For certain operations, graphics controller 208 may further be configured to generate PCI protocol transactions on AGP bus 210. The AGP interface of bus bridge 202 may thus include functionality to support both AGP protocol transactions as well as PCI protocol target and initiator transactions. Display 226 is any electronic display upon which an image or text can be presented. A suitable display 226 includes a cathode ray tube ("CRT"), a liquid crystal display ("LCD"), etc.

It is noted that, while the AGP, PCI, and ISA or EISA buses have been used as examples in the above description, any bus architectures may be substituted as desired. It is further noted that computer system 200 may be a multiprocessing computer system including additional processors (e.g. processor 10a shown as an optional component of computer system 200). Processor 10a may be similar to processor 10. More particularly, processor 10a may be an identical copy of processor 10. Processor 10a may be connected to bus bridge 202 via an independent bus (as shown in FIG. 9) or may share CPU bus 224 with processor 10. Furthermore, processor 10a may be coupled to an optional L2 cache 228a similar to L2 cache 228.

Figure 10:
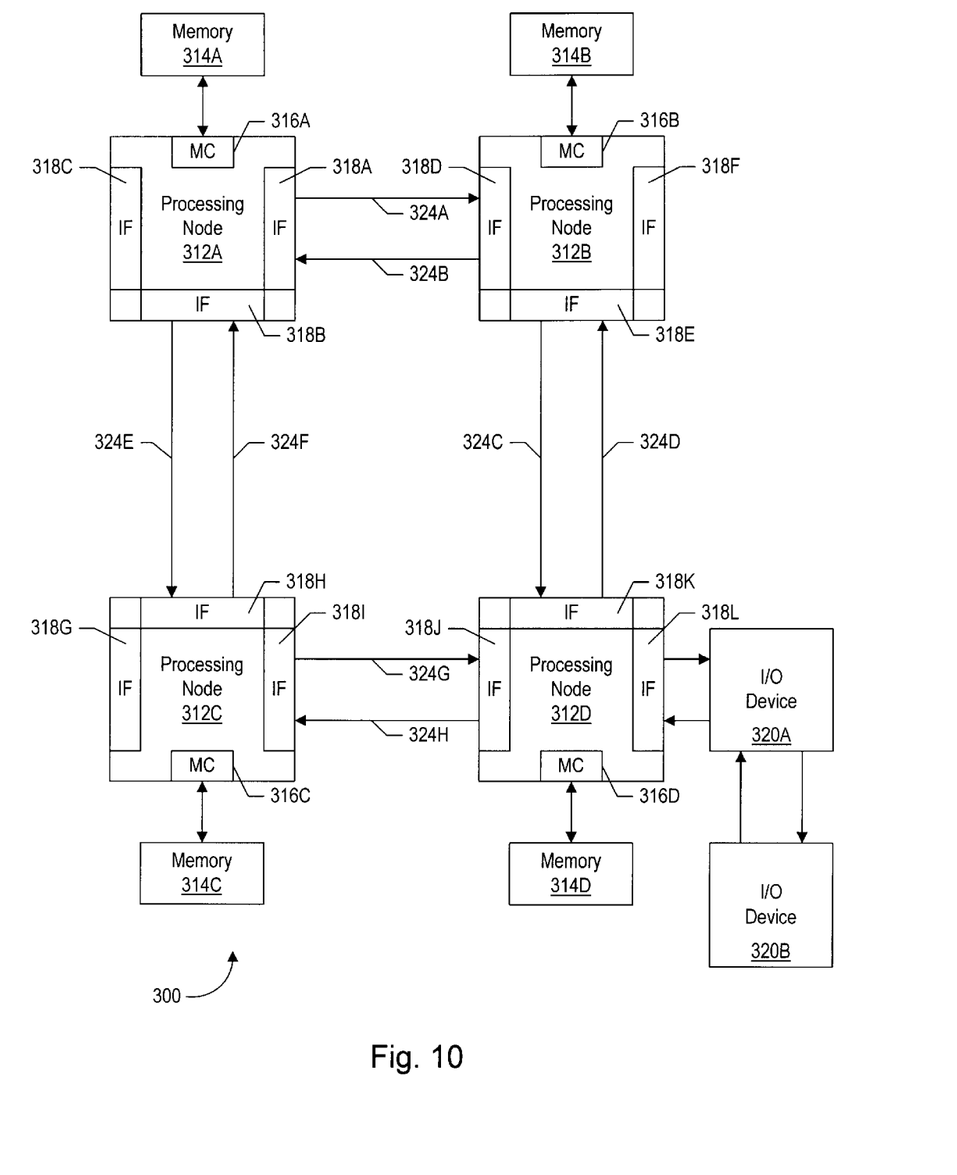
FIG. 10 is a block diagram of another embodiment of a computer system including the processor shown in FIG. 1.

Turning now to FIG. 10, another embodiment of a computer system 300 is shown. Other embodiments are possible and contemplated. In the embodiment of FIG. 10, computer system 300 includes several processing nodes 312A, 312B, 312C, and 312D. Each processing node is coupled to a respective memory 314A–314D via a memory controller 316A–316D included within each respective processing node 312A–312D. Additionally, processing nodes 312A–312D include interface logic used to communicate between the processing nodes 312A–312D. For example, processing node 312A includes interface logic 318A for communicating with processing node 312B, interface logic 318B for communicating with processing node 312C, and a third interface logic 318C for communicating with yet another processing node (not shown). Similarly, processing node 312B includes interface logic 318D, 318E, and 318F; processing node 312C includes interface logic 318G, 318H, and 318I; and processing node 312D includes interface logic 318J, 318K, and 318L. Processing node 312D is coupled to communicate with a plurality of input/output devices (e.g. devices 320A–320B in a daisy chain configuration) via interface logic 318L. Other processing nodes may communicate with other I/O devices in a similar fashion.

Processing nodes 312A–312D implement a packet-based link for inter-processing node communication. In the present embodiment, the link is implemented as sets of unidirectional lines (e.g. lines 324A are used to transmit packets from processing node 312A to processing node 312B and lines 324B are used to transmit packets from processing node 312B to processing node 312A). Other sets of lines 324C–324H are used to transmit packets between other processing nodes as illustrated in FIG. 10. Generally, each set of lines 324 may include one or more data lines, one or more clock lines corresponding to the data lines, and one or more control lines indicating the type of packet being conveyed. The link may be operated in a cache coherent fashion for communication between processing nodes or in a noncoherent fashion for communication between a processing node and an I/O device (or a bus bridge to an I/O bus of conventional construction such as the PCI bus or ISA bus). Furthermore, the link may be operated in a non-coherent fashion using a daisy-chain structure between I/O devices as shown. It is noted that a packet to be transmitted from one processing node to another may pass through one or more intermediate nodes. For example, a packet transmitted by processing node 312A to processing node 312D may pass through either processing node 312B or processing node 312C as shown in FIG. 10. Any suitable routing algorithm may be used. Other embodiments of computer system 300 may include more or fewer processing nodes then the embodiment shown in FIG. 10.

Generally, the packets may be transmitted as one or more bit times on the lines 324 between nodes. A bit time may be the rising or falling edge of the clock signal on the corresponding clock lines. The packets may include command packets for initiating transactions, probe packets for maintaining cache coherency, and response packets from responding to probes and commands.

Processing nodes 312A–312D, in addition to a memory controller and interface logic, may include one or more processors. Broadly speaking, a processing node comprises at least one processor and may optionally include a memory controller for communicating with a memory and other logic as desired. More particularly, each processing node 312A–312D may comprise one or more copies of processor 10. External interface unit 18 may includes the interface logic 318 within the node, as well as the memory controller 316.

Memories 314A–314D may comprise any suitable memory devices. For example, a memory 314A–314D may comprise one or more RAMBUS DRAMs (RDRAMs), synchronous DRAMs (SDRAMs), static RAM, etc. The address space of computer system 300 is divided among memories 314A–314D. Each processing node 312A–312D may include a memory map used to determine which addresses are mapped to which memories 314A–314D, and hence to which processing node 312A–312D a memory request for a particular address should be routed. In one embodiment, the coherency point for an address within computer system 300 is the memory controller 316A–316D coupled to the memory storing bytes corresponding to the address. In other words, the memory controller 316A–316D is responsible for ensuring that each memory access to the corresponding memory 314A–314D occurs in a cache coherent fashion. Memory controllers 316A–316D may comprise control circuitry for interfacing to memories 314A–314D. Additionally, memory controllers 316A–316D may include request queues for queuing memory requests.

Generally, interface logic 318A–318L may comprise a variety of buffers for receiving packets from the link and for buffering packets to be transmitted upon the link. Computer system 300 may employ any suitable flow control mechanism for transmitting packets. For example, in one embodiment, each interface logic 318 stores a count of the number of each type of buffer within the receiver at the other end of the link to which that interface logic is connected. The interface logic does not transmit a packet unless the receiving interface logic has a free buffer to store the packet. As a receiving buffer is freed by routing a packet onward, the receiving interface logic transmits a message to the sending interface logic to indicate that the buffer has been freed. Such a mechanism may be referred to as a "coupon-based" system.

I/O devices 320A–320B may be any suitable I/O devices. For example, I/O devices 320A–320B may include network interface cards, video accelerators, audio cards, hard or floppy disk drives or drive controllers, SCSI (Small Computer Systems Interface) adapters and telephony cards, modems, sound cards, and a variety of data acquisition cards such as GPIB or field bus interface cards.

Numerous variations and modifications will become apparent to those skilled in the art once the above disclosure is fully appreciated. It is intended that the following claims be interpreted to embrace all such variations and modifications.

What is claimed is:

1. A processor comprising:
   a decode unit configured to receive an instruction;
   an execution core coupled to said decode unit;
   wherein said instruction includes a displacement field and an immediate field, wherein said displacement field includes a first value, wherein said immediate field includes a second value, wherein said decode unit is configured to decode said instruction and convey instruction information, said first value, and said second value to said execution core, and wherein said execution core is configured to generate a result using a concatenation of said first value and said second value, and wherein said result comprises an address in response to said instruction corresponding to a first instruction type, and wherein said result does not comprise said address in response to said instruction corresponding to a second instruction type.

2. The processor of claim 1, wherein said execution core includes an address generation unit, wherein said address generation unit is configured to generate said result using said concatenation, and wherein said result comprises an address.

3. The processor of claim 2, wherein said address comprises more than 32 bits.

4. The processor of claim 1, wherein said execution core includes a functional unit, and wherein said functional unit is configured to generate said result using said concatenation.

5. The processor of claim 4, wherein said instruction includes a prefix, wherein said processor is configured to transition an operating mode from a first operand size to a second operand size in response to said prefix, and wherein said concatenation corresponds to said second operand size.

6. The processor of claim 5, wherein said first operand size is 32 bits, and wherein said second operand size is 64 bits.

7. The processor of claim 1, wherein said execution core is configured to convey said result to a register file.

8. The processor of claim 1, wherein said execution core is configured to convey said address to a data cache.

9. The processor of claim 1, wherein said execution core is configured to convey said result to a data cache in response to said instruction corresponding to a first instruction type, and wherein said execution core is configured to convey said result to a register file in response to said instruction corresponding to a second instruction type.

10. The processor of claim 1, wherein said first value comprises 32 bits, wherein said second value comprises 32 bits, and wherein said concatenation comprises 64 bits.

11. A method comprising:
    receiving an instruction, wherein said instruction includes a displacement field and an immediate field, wherein said displacement field includes a first value, and wherein said immediate field includes a second value;
    concatenating said first value and said second value to generate a third value; and
    generating a result using said third value, and wherein said result comprises an address in response to said instruction corresponding to a first instruction type, and wherein said result does not comprise said address in response to said instruction corresponding to a second instruction type.

12. The method of claim 11, where said generating said result further comprises:
    generating an address using said third value.

13. The method of claim 12, wherein said address comprises more than 32 bits.

14. The method of claim 11, further comprising:
    storing said result into a register.

15. The method of claim 14, further comprising:
    transitioning an operating mode from a first operand size to a second operand size in response to an prefix corresponding to said instruction, wherein said result corresponds to said second operand size.

16. The method of claim 15, wherein said first operand size is 32 bits, and wherein said second operand size is 64 bits.

17. The method of claim 11, wherein said first value comprises 32 bits, wherein said second value comprises 32 bits, and wherein said third value comprises 64 bits.

18. A computer system comprising:
    a processor including:
      a decode unit configured to receive an instruction;
      an execution core coupled to said decode unit;
      wherein said instruction includes a displacement field and an immediate field, wherein said displacement field includes a first value, wherein said immediate field includes a second value, wherein said decode unit is configured to decode said instruction and convey instruction information, said first value, and said second value to said execution core, and wherein said execution core is configured to generate a result using a concatenation of said first value and said second value, and wherein said result comprises an address in response to said instruction corresponding to a first instruction type, and wherein said result does not comprise said address in response to said instruction corresponding to a second instruction type; and
    an input/output (I/0) device coupled to said processor and to another computer system, wherein said I/0 device is configured to communicate between said processor and said another computer system.

19. The computer system of claim 18, wherein said I/O device comprises a modem.

20. A processor comprising:
    a decode unit configured to receive an instruction;
    an execution core coupled to the decode unit;

wherein the instruction includes a displacement field and an immediate field, wherein the displacement field includes a first value, wherein the immediate field includes a second value, wherein the decode unit is configured to decode the instruction and convey instruction information, the first value, and the second value to the execution core, and wherein the execution core is configured to generate a result using a concatenation of the first value and the second value in response to a first size applying to the instruction, and wherein the execution core is configured to generate the result using at least one of the first value and the second value independent of another one of the first value and the second value in response to a second size applying to the instruction.

21. The processor as recited in claim 20 wherein the first size exceeds the second size.

22. The processor as recited in claim 20 wherein the first size and the second size are each operand sizes.

23. The processor as recited in claim 22 wherein the second value is used independent of the first value.

24. The processor as recited in claim 20 wherein the first size and the second size are each address sizes.

25. The processor as recited in claim 24 wherein the first value is used independent of the second value.

* * * * *